United States Patent [19]

Bowns et al.

[11] Patent Number: 5,051,208

[45] Date of Patent: Sep. 24, 1991

[54] SILVER/SILVER CHLORIDE COMPOSITIONS

[75] Inventors: Richard E. Bowns, Hacienda Heights; David J. Ouellette, Alta Loma, both of Calif.

[73] Assignee: Advanced Products Inc., Cheshire, Conn.

[21] Appl. No.: 546,611

[22] Filed: Jun. 29, 1990

[51] Int. Cl.$^5$ ............................................... H01B 1/06
[52] U.S. Cl. ................................... 252/511; 252/518; 524/401; 524/439; 523/457; 523/512
[58] Field of Search ................ 252/514, 518; 524/439, 524/401; 523/457, 458, 459, 512, 514, 516; 204/435; 128/640, 803

[56] References Cited

U.S. PATENT DOCUMENTS 4,507,194  3/1985  Shimomura et al. ............... 204/435
4,877,512  10/1989  Bowns et al. .

OTHER PUBLICATIONS

Metz No. 7 Silver Flake Product Brochure.
AAMI Standards & Recommended Practices, 1985 Reference Edition, "American National Standard for Pregelled ECG Disposable Electrodes".

*Primary Examiner*—Josephine Barr
*Attorney, Agent, or Firm*—William A. Simons

[57] ABSTRACT

A conductive silver/silver chloride composition consisting essentially of:
(a) about 5 to about 15 parts by weight of a polyester or phenoxy thermoplastic polymer or mixtures thereof;
(b) at least a sufficient amount of an organic solvent capable of dissolving polymer (a);
(c) about 35 to about 60 parts by weight of silver flake; and
(d) about 5 to about 20 parts by weight silver chloride.

8 Claims, No Drawings

SILVER/SILVER CHLORIDE COMPOSITIONS

BACKGROUND OF THE INVENTION

1. Field of the Invention

This invention relates to selected conductive compositions containing silver and silver chloride which are particularly useful for fabricating into human contact electrodes.

2. Brief Description of the Prior Art

Human contact electrodes, especially those used for measuring cardiovascular activity, have been made by applying (e.g. electrodepositing) a conductive film of metallic silver and silver chloride onto a tab-like substrate. The coated substrate is then affixed with a suitable adhesive by which the tab-like substrate (i.e. electrode) will maintain contact with the human body In taking a human cardiovascular reading, an electrode is affixed to a desired position of the human chest and an electrical connection is also attached to the electrode from an electrocardiogram (EKG) machine.

One problem with prior silver/silver chloride electrodes is that they may not work for at least 30 seconds after defibrillation electrical charge or shock was applied to a human chest. During that time, medical personnel will be unable to monitor the activity of the heart. This period of unoperability is caused by polarization of the electrode due to the defibrillation electrical charge.

The invention disclosed in U.S. Pat. No. 4,877,512, which issued to Richard E. Bowns and David L. Diepholz on Oct. 31, 1989, presented a commercially viable solution to that problem. This U.S. patent is incorporated herein by reference in its entirety. While the silver/silver chloride compositions disclosed in this patent were superior to the prior art silver/silver chloride compositions, the vinylidene chloride thermoplastic polymer used therein lacked high temperature (i.e., above 250° C.) thermal stability and long-term shelf life necessary for all types of application modes of the composition onto a substrate. Silver/silver chloride compositions, having a polyurethane thermoplastic resin, are also known for this use; however, they are also believed to lack high temperature thermal stability and long-term shelf life. Accordingly, there is a need for silver/silver chloride composition having better high temperature thermal stability and shelf life properties than the compositions disclosed in U.S. Pat. No. 4,877,512. The present invention is a solution to that need.

BRIEF SUMMARY OF THE INVENTION

Accordingly, the present invention is directed to a conductive silver/silver chloride composition consisting essentially of:

(a) about 5 to about 15 parts by weight of a polyester or phenoxy thermoplastic polymer or mixtures thereof;

(b) at least a sufficient amount of organic solvent to completely dissolve said polymer (a);

(c) about 35 to about 60 parts by weight of silver flake; and (d) about 5 to about 20 parts by weight of silver chloride.

DETAILED DESCRIPTION OF THE PREFERRED EMBODIMENT

As stated above, the present invention encompasses the combination of four different components: a polyester or phenoxy thermoplastic polymer or a mixture thereof, a suitable solvent for dissolving that polymer (e.g. dibasic ester solvent or methyl ethyl ketone), silver flake particles and silver chloride particles.

The polyester or phenoxy thermoplastic polymer of the present invention provides a final composition having good electrical resistivity for the composition. The thermoplastic polymers of this invention preferably have a glass transition point of above about 100° F. The glass transition temperature ($T_G$) is the temperature at which a material such as these polymers change from a brittle, vitreous state to a plastic state. More preferably, the glass transition temperature is above about 110° F.

The preferred polyester thermoplastic resin is a linear, high-tensile, aromatic polyester resin such as that sold under the trade designation VITEL PE-222 by Goodyear Tire and Rubber Co. This material is said by its supplier to have a glass transition point of 117° F./47° C. This material has good adhesion to polyester substrates commonly used in the electrode field.

The preferred phenoxy thermoplastic resin is one made from bisphenol-A and epichlorohydrin. The preferred phenoxy resins of the resin invention also do not have terminal, highly reactive epoxy groups and are thermally stable materials with a long shelf life. The most preferred phenoxy resins are BAKELITE PKHH and PKHC available from Union Carbide Corp. of Danbury, CT. Their glass transition points are both about 100° C. These phenoxy resins also have good adhesion to polyester substrates.

Preferably, the polyester or phenoxy resin is present in about 6 to about 11 parts by weight in the total silver/silver chloride composition. More preferably, this resin is present in about 7 to about 10 parts by weight in the total composition.

Any organic solvent which dissolves the polyester and phenoxy thermoplastic polymers may be employed in the present composition. Methyl ethyl ketone (MEK) and dibasic ester solvent (DBE) are the preferred solvents for this composition because they quickly dissolve the polyester or phenoxy thermoplastic polymer and have excellent drying speed on the thermal curing conditions employed (i.e. 150° F. to 300° F.) Preferably, the MEK or the DBE is employed in about 25 to about 50 parts, based on total parts (i.e., both volatiles and nonvolatiles), by weight of the conductive composition. More preferably, the amount of solvent is from about 28 to about 40 parts by weight in the total composition.

The silver flake particles provide the present composition with the desired electrical conductivity. The particle size of the silver flake is preferably from about 0.25 to about 1.2 microns, more preferably about 0.4–1.0 microns as measured by a Fisher Sub-sieve Sizer according to test method ASTM B330-65 at 10 inch pounds. If the silver flake is more or less than this range, the electrical properties may be adversely effected (e.g., the electrical resistivity of the composition may be too high) for the preferred use in human contact electrodes The preferred silver flake is Metz #7 made by the Metz Metallurgical Corporation of South Plainfield, N.J.

Preferably, the amount of silver flake is from about 38 to about 54, more preferably from about 42 to about 51, parts by weight, based on the total nonvolatile parts of the composition.

The amount of silver chloride used in the present composition provides specific electrical properties which aid in shortening recovery time after polarization. Preferably, the silver chloride is employed in about 7 to about 15 parts by weight of the composition. More preferably, from about 8 to about 12 parts by weight of the composition.

Other minor conventional components may be added to the conductive composition. These include diluents or viscosity modifying agents, defoamer surfactants, waxes, coupling agents, and the like. The viscosity of the final conductive composition of the invention is preferably from about 25 to about 30 seconds at 71° F. (#2 Zahn Cup) for high speed applications onto a substrate. For screen printing application methods, the final viscosity is preferably about 8,000 to about 20,000 centipoises at 75° F.

The components of the present invention may be mixed together by any conventional means. Preferably, it is desirable to mix all of the ingredients together in a conventional agitated mixing apparatus (e.g., a steel ball mill) to create a uniform mixture wherein the polymer is dissolved in the solvent. This mixing operation preferably continues until a fineness of grind of the composition of greater than about 7 Hegman's is obtained.

The compositions of this invention may be applied to substrates by a variety of printing or spraying techniques, such as screen-printing. Once the conductive composition has been applied to the electrode substrate, it is dried and cured by exposing it and the substrate to elevated temperatures (about 150° F. to about 300° F.) Any conventional thermal curing apparatus may be used.

The conductive compositions of the present invention may be applied to conventional rigid or flexible substrates. Whether the substrate is flexible or rigid in nature, the substrate may or may not have to be pretreated or precoated with any other substance before applying the composition of the present invention.

The following Examples are shown to better illustrate the present invention. All parts and percentages are by weight unless otherwise explicitly stated.

EXAMPLE 1

A thermally curable silver/silver chloride composition having the components listed below was prepared by first dissolving the polyester resin in the dibasic ester solvent using a Cowles mixer. The dissolved resin, silver, and silver chloride were together then passed through roll mill until a uniform dispersion having a fineness of grind of greater than 7 Hegman units was obtained. The relative weights of each of the four components were as follows:

| Components | Parts by Weight |
| --- | --- |
| Polyester Resin (1) | 9.02 |
| Dibasic Ester Solvent | 33.93 |
| Silver Flake (2) | 46.85 |
| Silver Chloride (3) | 10.19 |
| | 99.99 |

(1) VITEL PE-222 available from Goodyear Tire & Rubber Co.
(2) METZ #7 sold by the Metz Metallurgical Corp. of South Plainfield, NJ. This silver flake has a particle size of 0.7-1.0 micron Fisher Sub-sieve Particle Size and 0.7-1.0 m²/g surface area.
(3) Passed through −325 mesh screen.

The formal dispersion was tested and found to have the following properties:

| Specification | Amount |
| --- | --- |
| Theoretical Density | 17.75 lbs./gal. |
| Nonvolatile weight solids | 66.08% |
| Viscosity | about 12,000 centipoises (Brookfield RVT, 20 rpm, Spindle No. 6, 30° C.) |
| Electrical Resistance (A) | 0.036 ohms/sq. @ 1.0 mil. |

(A) For the electrical resistance test, the following parameters were employed:
Test Substrate: Mylar
Reduction: None
Dispersion Applied By: Screen print
Curing Schedule: 10 minutes at 225° F.
Oven Type: Convection The formed dispersion was also printed onto human contact electrode substrates and then thermally cured to those substrates to form electrodes. These electrodes, when tested in accordance to Test Procedure AA-MIEG-12, using an Xtratech electrode tester available from Omnica of Tustin, CA, possessed the excellent electrode properties shown in Table I below.

EXAMPLE 2

A second thermally curable silver/silver chloride composition having the components listed below was also prepared by first dissolving the phenoxy resin in the dibasic ester solvent using a Cowles mixer. The dissolved resin, silver, and silver chloride were together then passed through roll mill until a uniform dispersion having a fineness of grind of greater than 7 Hegman units was obtained. The relative weights of each of the four components were as follows:

| Components | Parts by Weight |
| --- | --- |
| Phenoxy Resin (4) | 9.05 |
| Dibasic Ester Solvent | 33.9 |
| Silver Flake (2) | 46.85 |
| Silver Chloride (3) | 10.20 |
| | 100.00 |

(4) BAKELITE PKHH available from Union Carbide Corp.
(2) METZ #7 sold by the Metz Metallurgical Corp. of South Plainfield, NJ. This silver flake has a particle size of 0.7-1.0 micron Fisher sub-sieve particle size and 0.7-1.0 m²/g surface area.
(3) Passed through −325 mesh screen.

The formal dispersion was tested and found to have the following properties:

| Specification | Amount |
| --- | --- |
| Theoretical Density | 17.55 lbs./gal. |
| Nonvolatile weight solids | 66.1% |
| Viscosity | about 12,000 centipoises (Brookfield RVT, 20 rpm, Spindle No. 6 30° C.) |
| Electrical Resistance (A) | 0.041 ohms/sq. @ 1.0 mil. |

(A) For the electrical resistance test, the following parameters were employed:
Test Substrate: Mylar
Reduction: None
Dispersion Applied By: Screen print
Curing Schedule: 10 minutes at 225° F.
Oven Type: Convection The formed dispersion was also printed onto human contact electrode substrates and then thermally cured to those substrates to form electrodes. These electrodes, when tested in accordance to Test Procedure AA-MIEG-12, using an Xtratech electrode tester available from Omnica of Tustin, CA, possessed the excellent electrode properties shown in Table I below:

TABLE I

| | Thickness (mil) | AC Impedance (30 Sec. Avg. Value) | DC Offset Voltage (80 Sec Avg. Value) | Recovery (35 Sec. Offset Voltage) |
| --- | --- | --- | --- | --- |
| Ex. 1 | .29 | 42.3 ohm | 0.1 mV | 12.1 mV |
| Ex. 1 | .38 | 44 | −0.1 | 12.5 |
| Ex. 2 | .42 | 40.3 | 0.0 | 9.1 |
| Ex. 2 | .33 | 50 | −0.2 | 10.4 |
| AAMI Limits | | <2K ohm | 100 mV max. | 100 mV max. |

These results shown that both systems tested passed as judged by the AAMI limits at different applied thicknesses.

What Is claimed is:

1. A conductive silver/silver chloride composition consisting essentially of:
   (a) about 5 to about 15 parts by weight of a polyester or phenoxy thermoplastic polymer or mixtures thereof;
   (b) at least a sufficient amount of an organic solvent capable of dissolving polymer (a);
   (c) about 35 to about 60 parts by weight of silver flake; and
   (d) about 5 to about 20 parts by weight silver chloride.

2. The composition of claim 1, wherein said thermoplastic polymer is a polyester polymer.

3. The composition of claim 1, wherein said thermoplastic polymer is a phenoxy polymer.

4. The composition of claim 1, wherein said solvent is either methyl ethyl ketone or dibasic ester solvent.

5. The composition of claim 1, wherein said silver flake has a particle size from about 0.25 to about 1.2 microns.

6. The composition of claim 1, wherein:
   (a) is present in about 6 to about 11 parts by weight;
   (b) is present in about 25 to about 50 parts by weight;
   (c) is present in about 38 to about 54 parts by weight; and
   (d) is present in about 7 to about 15 parts by weight.

7. The composition of claim 1, wherein the thermoplastic polymer has a glass transition value above about 100° F.

8. A conductive silver/silver chloride composition consisting essentially of:
   (a) about 7 to about 10 parts by weight of a polyester or phenoxy thermoplastic resin or mixtures thereof having a glass transition value of above about 100° F;
   (b) about 28 to about 40 parts by weight of methyl ethyl ketone or dibasic ester solvent;
   (c) about 42 to about 51 parts by weight of silver flake having a particle size from about 0.25 to about 1.2 microns; and
   (d) about 8 to about 12 parts by weight silver chloride.

* * * * *